United States Patent [19]

Gooch

[11] 4,348,952
[45] Sep. 14, 1982

[54] CROSS AXIS MECHANISM

[75] Inventor: Kendrick J. Gooch, Bethany, Conn.

[73] Assignee: USM Corporation, Farmington, Conn.

[21] Appl. No.: 226,189

[22] Filed: Jan. 19, 1981

[51] Int. Cl.³ .............................................. B30B 3/04
[52] U.S. Cl. .................................. 100/158 R; 72/243; 425/366
[58] Field of Search ............... 100/158 R, 162 B, 168; 68/108; 72/233, 240, 243, 248; 425/366, 367

[56] References Cited

U.S. PATENT DOCUMENTS

| 2,965,920 | 12/1960 | Whittum ......................... 100/158 R |
| 3,240,148 | 3/1966 | Varga ............................. 100/158 R |
| 3,273,199 | 9/1966 | Kleinewefers .............. 100/158 R X |

FOREIGN PATENT DOCUMENTS 700107 12/1964 Canada ........................... 100/158 R Primary Examiner—Peter Feldman
Attorney, Agent, or Firm—Vincent A. White

[57] ABSTRACT

A mechanism for inducing a crossing of one axis of a roll with respect to the axis of a second roll on a calender roll machine, to correct for varying amounts of roll deflection under varying operating loads. The mechanism includes a pair of biased levers which are pivoted on a frame diametrically across from one another against a bearing box on a calender roll. The roll has a mechanism at each end thereof. The levers are biased by incrementally movable pistons which when actuated, swing the respective ends of the calender roll in an arc about its midpoint to effectuate the controlled skewing of its axis with respect to the axis of a calender roll thereadjacent.

13 Claims, 2 Drawing Figures

4,348,952

CROSS AXIS MECHANISM

BACKGROUND OF THE INVENTION

(1) Field of the Invention

This invention relates to calender roll machines, and more particularly to means for adjustably crossing the axis of one roll in a calender roll machine with respect to an adjacent roll in that calender roll machine.

(2) Prior Art

Calender roll machines are machines having a plurality of generally horizontally disposed rolls each journalled between a pair of frames. The rolls may produce between them, plastic films at high speeds and temperatures, to gauges as thin as several thousandths of an inch, within tolerances of less than plus or minus one ten-thousandth of an inch.

When material is introduced between the rolls, and when one roll is arranged over the other, the material therebetween causes them to deflect, resulting in a sheet which is thicker or heavier along its center. If the axis of the top roll is crossed or skewed with respect to the axis of the lower roll, a crown effect is obtained. Too great a crossing would result in a sheet having a thin center. Thus, the amount of crossing must be regulated to produce a sheet of uniform thickness.

Cross axis systems of the prior art include gear and screw mechanisms built into the frame supporting the rolls, which require internal housing parts and large cut-outs in the frame of the calender, as well as large chips to control thrust of the roll where the bearings would otherwise have been mated with the frames.

BRIEF SUMMARY OF THE INVENTION

The present invention comprises a calender roll machine having a frame arrangement within which at least a first and a second roll is rotatively journalled, wherein a cross-axis means is disposed at an end of at least the first roll, the cross-axis means permitting the axis of the first roll to be controllably skewed with respect to the axis of the second roll. The cross-axis means comprises a primary mechanism and a secondary mechanism diametrically arranged on a bearing disposed near the end of the first roll. The primary mechanism comprises an empowerable lever pivotably disposed on a housing attached to the frame between an empowerment means and the bearing on the roll. The secondary mechanism comprises a passive lever pivotally disposed on a housing attached to the frame between a biasing means and the bearing on the roll, the empowerment means comprising a motor and gear box which act to reciprocably move an actuator in contact with a first arm of the empowerable lever.

The bearing has an outer housing having an annular groove arranged therearound and an annular pressure plate of semi-circular cross-section is disposed in the groove. The biasing means comprises a pressurizable cylinder arranged on the housing on the frame, having a reciprocably movable shaft in contact with a first arm of the passive lever.

The empowerable lever has a second arm, the distal end of which has a channel thereacross which slidingly mates with the annular pressure plate on the housing of the bearing, and the passive lever also has a second arm the distal end of which, has a channel thereacross which slidingly mates with the annular pressure plate diametrically across from the second arm of the empowered lever.

When the empowerment means effectuates forced pivoted movement of the empowerable lever, the bearing is displaced along an arcuate path as is the axis of the roll, skewing it accordingly with respect to the axis of the other roll, and a corresponding pivoted movement is induced into the passive lever.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

Figure 1:
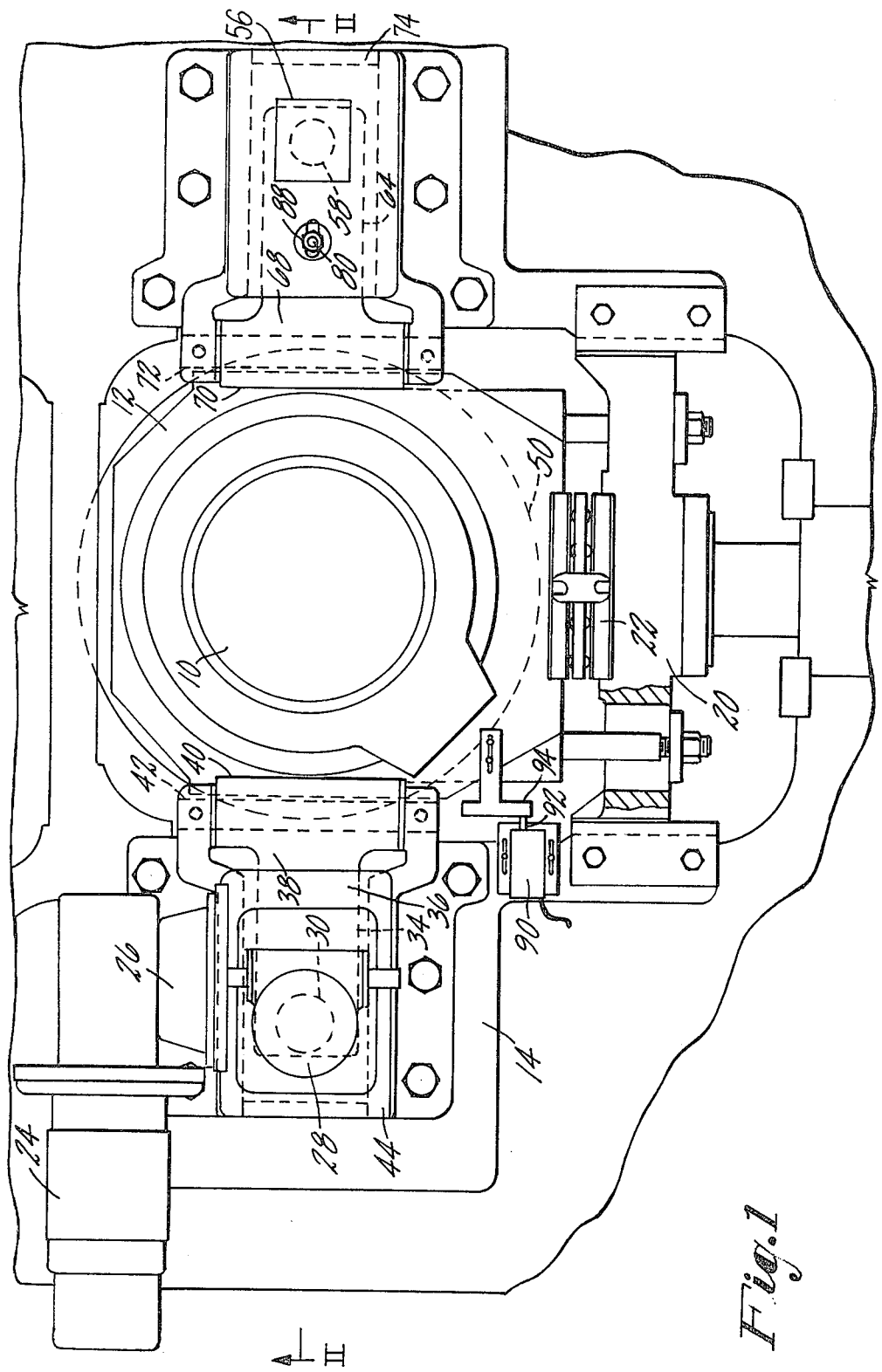
FIG. 1 is an end view of a calender roll with the cross-axis mechanism arranged therewith.
Figure 2:
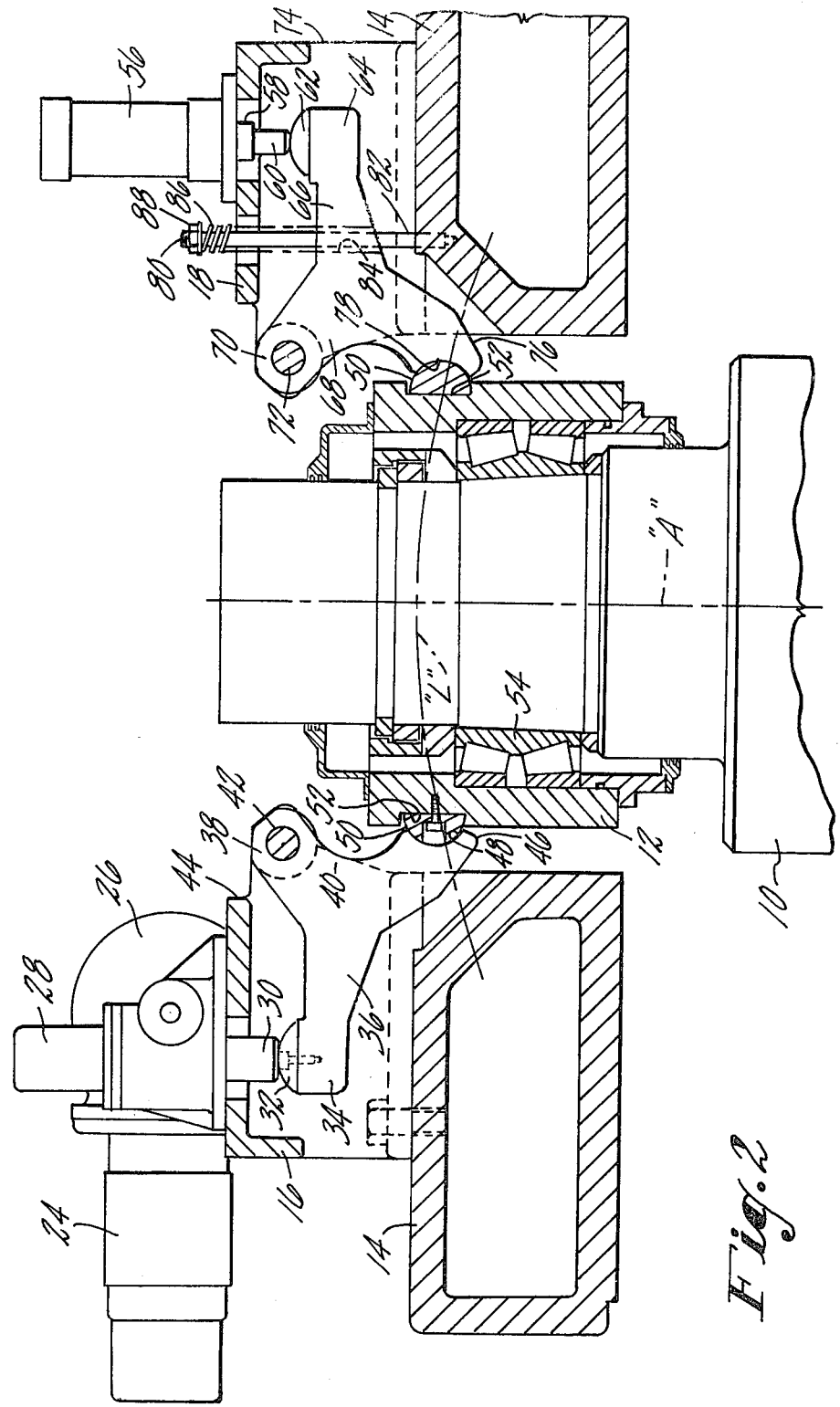
FIG. 2 is a view taken along the lines II—II of FIG. 1.

Referring now to the drawings in detail, and particularly to FIG. 1, there is shown in an end view, a first calender roll 10 having an axis of rotation A, is disposed in a bearing box 12 arranged through a frame 14 of a calender roll machine which machine will have at least one other calender roll, not shown, in generally parallel alignment with said first calender roll 10. A primary cross-axis mechanism 16 is disposed on the frame 14 on the left side of the calender roll 10, as shown in FIG. 1, and is in registration with the bearing box 12, as shown in FIG. 2. A secondary cross-axis mechanism 18 is disposed diametrically opposite the calender roll 10, and is attached to the frame 14, as shown in FIGS. 1 and 2, in registration with the bearing box 12. Both a primary and a secondary cross mechanism or means, 16 and 18, may be disposed on each end of the calender roll 10.

A calender roll support 20, is shown in FIG. 1, attached to the frame 14, is in rolling support of the bearing box 12, by a thrust bearing 22.

The primary cross-axis mechanism 16 comprises a drive motor 24 which transmits power through a proper gear arrangement 26, to an axially movable actuator 28, which in this embodiment, comprises a worm gear. The movable actuator 28 has an inner end 30 which is in sliding contactual engagement with a first swivel block 32 of hemispherical shape. The first swivel block 32 is fixedly attached to the distal end of a first arm 34 that comprises a portion of a first lever 36, which is of "Y" configuration, as shown in a side view, in FIG. 2. The proximal end of the first lever 36 has a portion 38, comprising a main arm 40 which pivots in an axis 42, which axis 42 is part of a housing 44 that is secured to the frame 14. The bifurcated portion 38 also includes a second arm 46, having an arcuately arranged channel 48 extending across its distal end. The channel 48 is in sliding or pivoting contact with an annular pressure plate 50. The pressure plate 50 is of semi-circular cross-section, and is secured in an annular groove 52 near one end of the bearing box 12. The bearing box 12 encloses an annular array of roller bearings 54 which surround the journal of the calender roll 10.

The secondary cross-axis mechanism 18 includes a free acting biasing means 56, which may comprise a spring means or a hydraulic cylinder that has an inner end 58 comprising a shaft 60 which is in sliding contactual engagement with a second swivel block 62 of hemispherical shape. The second swivel block 62 is fixedly attached to the distal end of a first arm 64 that comprises a portion of a second lever 66, which is of "Y" configuration, as shown in a side view, in FIG. 2. The proximal end of the second lever 66 has a portion 68, comprising a main arm 70, which pivots about an axis 72, which is part of a housing 74 that is secured to the frame 14. The lever also comprises a second arm 76, having an arcuately arranged channel 78 extending across its distal end. The channel 78 is in sliding contact with the annular pressure plate 50. The secondary cross-axis mechanism 18 also includes a back-up biasing means 80 comprising a stud 82 which extends through a bore 84 in the first arm 64 and is secured to the frame 14. A spring 86 is arranged around the stud 82 and stepped against a shoulder portion of the bore 84 in the first arm 64. The stud 82 has a nut 88 on its distal end to keep the spring 86 on the stud 82, and to permit adjustable control of the compression of the spring 86.

A sensing means 90, shown in FIG. 1, which may comprise a linear voltage transducer, is arranged on the frame 14. The sensing means 90 has a probe 92 which determines the location of a contact plate 94 attached to the bearing box 12, and may be arranged through a proper circuit, not shown, to provide data on the location of the axis of the roll 10, to facilitate any further displacement or corrective action thereof through an automatic feedback network, or operator initiated movement.

The operation of the first and second axis crossing mechanism 16 and 18, only one set being shown, is such so as to effectuate a slight arcuate movement in the bearing box 12 and journal along a locus "L" and hence a skewing of the axis A, as shown in FIG. 2, of the roll 10 at each end of the calender roll 10, only one end however, being shown, and each end moving in opposite directions to effectuate the crossing or skewing of the axis between the first roll 10 and its adjacent roll, not shown. The drive motor 24 is actuated through a proper circuit, not shown, to reciprocably drive the gear arrangement 26 and longitudinally displace the actuator 28. The inner end 30 of the actuator 28, for purposes of this description, shall be recited as being forced against the first arm 34 of the first lever 36, producing a counter-clockwise motion therein, as viewed in FIG. 2, about the axis 42. The second arm 46 is likewise caused to travel in a counter-clockwise direction against the annular pressure plate 50, to effect a slight arcuate path of travel of the bearing box 12 and the axis A of the roll 10, therein, which arcuate path is indicated by the dashed line L. Movement of the end of the roll 10, to the right viewing FIG. 2, would cause a corresponding counter-clockwise movement in second arm 76 about the axis 92 of the second lever 66, due to the engagement of the pressure plate 50 with the channel 78 extending across the distal end of the second arm 76. The first arm 64 is therefore pivoted counter-clockwise to force the shaft 60 against the inner end 58 of the biasing means 56. Reversal of the motor 24 would cause the first lever 36 to "back-off" in a clockwise direction about its axis 42, and the biasing means 56, being "preloaded" would cause a force against the first arm 64 of the second passive lever 66 to push the end of the roll 10 and the axis A thereof, as well as the bearing box 12 leftwardly as may be envisioned in FIG. 2.

The spring 86 arranged between the second lever 66 and the stud 80 acts as a "back-up" in case of failure in the biasing means 56, such as a loss of pressure or breakdown. The interfitting relationship between the annular groove 52 in the bearing box 12, and the biased interdigitated relationship between the channels 48 and 78 across the distal portions of the second arms 46 and 76 in the first and second levers 36 and 66 and pressure plate 50, effect an axial locking arrangement on the bearing box 12 and the roll 10, similar to a thrust bearing. The other end of the roll 10 may have a similar arrangement of primary and secondary cross-axis mechanisms, as aforementioned to effectuate similar reciprocal movement of the axis A in that end of the roll 12.

The sensing means 90 may be arranged at each end of the roll 10, as shown in FIG. 1, to show where the roll 10 is in regard to its desired location on its locus of travel "L", and to permit the machine operator to effect any corrective action, if necessary, through proper activating means of the primary mechanism 16.

Thus there has been shown an apparatus for effecting a movement of a roll in a calender roll machine, skewing or crossing it with respect to the axis of an adjacent roll to permit flat sheets of product to be rolled therebetween, the apparatus being adaptable to the outside of the frames of calender roll machines, obviating retooling of the machine frames and the attendant hydraulic systems used to cross the axis of prior art machines.

I claim:

1. A calender roll machine having a frame arrangement within which at least a first and a second roll, is each rotatively journalled, said machine including:
    a cross-axis means disposed at an end of at least said first roll, said cross-axis means permitting the axis of said first roll to be controllably skewed with respect to the axis of said second roll;
    said cross-axis means comprising a primary mechanism and a secondary mechanism including cooperating levers diametrically arranged at opposite sides of a bearing disposed near the end of said first roll at least one of said levers being empowerable for skewing said first roll.

2. A calender roll machine as recited in claim 1, wherein said empowerable lever is pivotably disposed on a housing attached to said frame between an empowerment means and said bearing on said roll.

3. A calender roll machine as recited in claim 1, wherein said secondary mechanism of said cross-axis means comprises a passive lever pivotally disposed on a housing attached to said frame between a biasing means and said bearing on said roll.

4. A calender roll machine as recited in claim 2, where said empowerment means comprises a motor and gear box which act to reciprocably move an actuator in contact with a first arm of said empowerable lever.

5. A calender roll machine as recited in claim 2 wherein said bearing has an outer housing having an annular groove arranged therearound and an annular pressure plate of semi-circular cross-section is disposed in said annular groove and engaged by mating surfaces of said levers.

6. A calender roll machine as recited in claim 3 wherein said biasing means comprises a pressurized cylinder disposed on said housing on said frame, said pressurizable cylinder having a reciprocably movable shaft in contact with a first arm of said passive lever.

7. A calender roll machine as recited in claim 4, wherein said empowerable lever has another arm, the distal end of which has a channel thereacross which pivotally mates with a semi-circular pressure plate on the housing of said bearing.

8. A calender roll machine as recited in claim 6, wherein said passive lever has another arm, the distal end of which has a channel thereacross which pivotally mates with a semi-circular pressure plate on the housing of said bearing.

9. A calender roll machine as recited in claim 8, wherein a back-up biasing means is operable between said housing of said secondary mechanism and said first arm of said passive lever to restrain said passive lever in case of failure of said first named biasing means.

10. A calender roll as recited in claim 8, wherein actuation of an empowerment means effectuates forced pivoted movement of said empowerable lever, causing an arcuate displacement of said bearing and skewing of the axis in the end of said roll and corresponding pivotal movement induced into said passive lever.

11. A calender roll machine as recited in claim 10, wherein said empowered lever and said passive lever are arranged on diametrically opposite sides of said bearing housing.

12. A calender roll machine as recited in claim 10, where said primary and secondary mechanisms are arranged on each end of said roll.

13. A calender roll machine as recited in claim 11, wherein a sensing means is disposed on the housing of one of said mechanisms, and is in contact with contact means on the housing of said bearing to provide data as to the location of the axis of the end of said roll in its arcuate locus.

* * * * *